Oct. 8, 1963  E. B. RICHMOND  3,106,507
EXPANDED FABRIC-LIKE MATERIAL COMPOSED OF CORE YARNS

Filed April 3, 1958

INVENTOR.
EARL B. RICHMOND
BY
ATTORNEY

United States Patent Office 3,106,507
Patented Oct. 8, 1963

3,106,507
EXPANDED FABRIC-LIKE MATERIAL
COMPOSED OF CORE YARNS
Earl B. Richmond, Plainville, Conn., assignor to The
Electric Storage Battery Company, a corporation of
New Jersey
Filed Apr. 3, 1958, Ser. No. 726,190
11 Claims. (Cl. 161—72)

The invention relates to new and improved methods of producing fabric-like materials, either woven, knitted, or non-woven, and to the materials themselves which are of a new and improved type when compared to those presently known in the art.

More specifically, the fabric-like materials of the invention are characterized by enhanced qualities of heat insulation and crash or impact absorption, such qualities being provided by the peculiar construction of the materials. In addition, the fabric has extraordinary qualities of strength and resistance to unraveling, the threads of the material being integrally and permanently bonded together at their points of juncture.

In its broadest sense, the present invention comprises the extrusion of a thread from a mixture of a thermoplastic resin and a blowing agent, forming said extruded thread into a fabric-like material, and thermally treating said fabric to decompose the blowing agent thereby evolving gases which, in turn, have the dual effect of expanding the thermoplastic thread to produce a cellular type material and welding the thermally softened threads at their points of juncture in a permanent bond under the expansive forces caused by the gas evolution.

Additionally, the invention contemplates the production of a fabric-like material from a combination consisting of the type of thread described above and another thread of a non-expandable character.

Another form of the invention may consist of a fabric-like material in which the threads that make up the material are expanded to different degrees.

In connection with the description of my process and product that follows, reference is made to the attached drawing in which, FIGURE 1 is an elevational view of a portion of a fabric material produced in accordance with the invention but before activation of the blowing agent;

Figure 1:
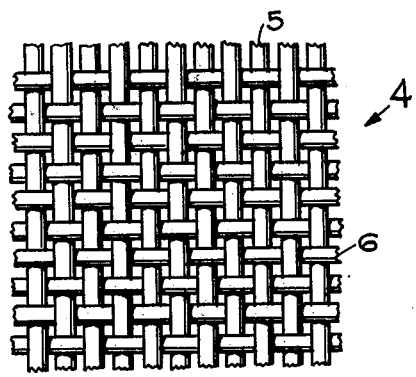

In the practice of the invention, there can be utilized a number of conventional thermoplastic resins such as, for example, polyvinyl chloride, polyethylene, and nylon. There can also be used copolymers of vinyl chloride and vinylidene chloride in which the latter substance is present in an amount of up to about 10%, and copolymers of vinyl chloride and vinyl acetate in which the vinyl acetate is present in an amount up to about 25%. In the case of polyvinyl chloride, it is suitable to use the material in the form of a vinyl plastisol, which is understood to be a dispersion of vinyl resin in a plasticizer, such as dioctyl phthalate, dibutyl phthalate, tricresyl phosphate, or the like. In the preparation of this plastisol, the vinyl resin can be physically stirred into the plasticizer, the resulting mix being in the form of a liquid having a viscosity determined by the various proportions of the resin and plasticizer present in the mix. In the preparation of such a mix to be used in the present invention, I have found a proportion of 100 parts by weight of resin and 5 to 300 parts by weight of plasticizer to be satisfactory. A preferred mix is 100 parts by weight of resin to from 20 to 100 parts by weight of the plasticizer.

It will be understood that to this mixture there can, if desired, be added a filler, such as a metal carbonate, or a clay in an amount of up to about 100 parts by weight, such filler acting as an extender for the vinyl resin and the plasticizer.

To the various mixtures described above, there is then added a blowing agent in a desired amount, such blowing agent being of the type that, when decomposed under application of heat, yields a gas that is compatible with the other constituents of the mixture. These blowing agents may, for example, be of any conventional type commonly used in the gas expansion of thermoplastics and rubber. The only qualifications are that they thermally decompose to produce a gas and leave a residue both of which are compatible with the other constituents of the mixture. The specific blowing agents for a given mixture will be selected on the basis of the temperature at which decomposition will commence as the agent must not be decomposed at extrusion temperatures. For example, since polyvinyl chloride, and the mentioned copolymers, is extrudable at a minimum temperature of 250° F., the blowing agent should not start to decompose at less than about 260° F. Additionally, blowing agents for mixtures containing polyethylene and nylon should not have a decomposition point of less than about 310° F. since those resins will be extruded at a minimum of about 300° F. Blowing agents that have been found to be satisfactory are those sold under the trade names of "Celogen" and "Celogen AZ" by Naugatuck Chemical Company. The chemical name for "Celogen" is p,p'-oxybis-(benzenesulfonyl hydrazide). "Celogen AZ" is an azo-dicarbonamide having a formula $CN=NC(COOH)_2$. The specific type blowing agent to be used in this connection does not form part of this invention since many such useful materials are available on the market. The blowing agent used, however, will be present in the mix in an amount of from about 0.5 part by weight to about 50 parts by weight, preferably from about 3 parts to about 10 parts, depending upon the desired degree of expansion and specific gravity of the final product.

It will be understood that conventional heat and light stabilizers of the organic or inorganic type can also be added to the mixture for known purposes in an amount of about 1 to about 5 parts by weight, with 3 parts being preferred. For polyvinyl chloride, and the copolymers of vinyl chloride and vinylidene chloride, these stabilizers may be salts of tin, lead, cadminum, or zinc. Also, organic stabilizers such as salts of fatty acids or mercapto derivatives of the metallic esters, are suitable. For polyethylene, an amine stabilizer will be used. Mixes of the following materials and proportions have been found to be suitable in the practice of the invention:

| Example 1 (No Filler) | Example 2 (Filler) |
|---|---|
| Polyvinyl chloride resin—100 parts by weight. | Polyvinyl chloride resin—100 parts by weight. |
| Dioctyl phthalate plasticizer—5 parts to 300 parts by weight (20 parts to 100 parts preferred). | Dioctyl phthalate plasticizer—5 parts to 300 parts by weight (20 parts to 100 parts preferred). |
| Celogen AZ—blowing agent—0.5 part to 50 parts by weight (3 parts to 10 parts being preferred). | Celogen AZ—blowing agent—0.5 part to 50 parts by weight (3 parts to 10 parts being preferred). |
|  | Clay filler—up to 100 parts by weight. |
| Lead carbonate stabilizer—1 part to 5 parts by weight (3 parts preferred). | Lead carbonate stabilizer—1 part to 5 parts by weight (3 parts preferred). |

As has been set forth above, other thermoplastic materials such as polyethylene and nylon are satisfactory for the practice of the invention. In the case of polyethylene, the same blowing agents and fillers may be used as in the case of polyvinyl chloride. No plasticizer, however, will be added to the mix, the necessary degree of plasticity being imparted by the application of heat during the subsequent extrusion process. Insofar as nylon is concerned, it may be used as a direct substitute for polyvinyl chloride with the exceptions that the stabilizer will be eliminated and a compatible plasticizer such as N-ethyl o- and p-toluene sulfonamide will be substituted.

In connection with polyvinyl chloride, the above discussion has been given in terms of its use in the form of a vinyl plastisol. It will be understood, however, that the mix can be produced in the form of a dry blend, i.e. a physical mixture of polyvinyl chloride resin and plasticizer. Additionally, it can be used in the granular state in which the mixing of the resin and the plasticizer occur under conditions of shear and elevated temperature.

To further describe the method of my invention, one of the above mixes is then fed to an extruder (or the actual mixing may occur within the extruder itself) of any conventional type and having an orifice designed to produce a thread of any desired physical dimensions or cross-sectional configuration. This stage of the operation is carried out at a temperature that will, at a minimum, impart the desired plasticity to the mix and yet, at a maximum, will be insufficient to activate the specific blowing agent that has been incorporated into the mix or degrade the resin.

Figure 3:
FIGURE 3 is a cross sectional view taken along the lines 3—3 of FIGURE 2.

Although it is satisfactory and within the scope of the present invention to extrude a thread which will consist solely of one of the mixtures described above, it is desirable for reasons of mechanical strength and handleability of the extruded thread to extrude the mixture around a core 11 such as is shown in FIGURE 3. Such core can consist of any one of a plurality of materials such as, for example, rayon, cotton, nylon, glass, twisted paper, and various metal wires. The only criteria for the material of the core is that it shall not be destroyed either by the materials of the mix or by the extrusion temperatures to be encountered.

The extruded thread is then transferred to a weaving or knitting machine, of any conventional type, and there knitted or woven into the desired form of fabric-like material. Possible end products for the material produced by the invention are floor coverings, crash helmets, linings for cold weather clothing, upholstery, and other uses where the properties of resiliency, heat insulation, impact absorption, or strength may be desired.

The extruded thread may also be laid down in random fashion and criss-crossed back and across itself rather than having the strands interlocked as during a knitting or weaving operation. This can be done with a continuous length of thread or a plurality of heterogeneous length threads.

Having produced by weaving, knitting, or otherwise an article in the shape of the desired final product, such article is then subjected to elevated temperatures for a time necessary to activate the specific blowing agent contained in the mix. These temperatures will generally be in the nature of from about 260° F. to about 400° F. It will be understood that the blowing agents used will always have a minimum thermal decomposition point above the temperatures encountered during the extrusion operation to avoid premature activation thereof. The maximum decomposition point will be below that which would result in a degradation of the resin during the relatively short time periods, in the nature of 5 minutes, involved in the flowing operation. Subjection to the desired heat treatment will decompose the blowing agent resulting in an evolution of gas throughout the thermoplastic thread which has been used to form the warp and woof strands of the material. Accordingly, a plurality of small cells will be formed in the thread and the thread will be expanded in diameter. As a result of the heat treatment also, the surface of the thread, consisting as it does of a thermoplastic material, will be softened. By reason of this softening coupled with the expansion of the threads, the surfaces of the warp and woof strands will be pressed into each other at their juncture and, upon subsequent cooling, a permanent weld or bond will be formed at such place.

Reference is now made to the appended drawing, FIGURE 1 showing a fabric-like material, designated generally as 4, consisting of warp and woof strands, 5 and 6 respectively. The material is shown here in the "as woven" condition and before further treatment. It will be noted that the material is of a rather loose weave and is relatively limp and flimsy in physical characteristics when compared with the finished article shown in FIGURE 2.

Figure 2:
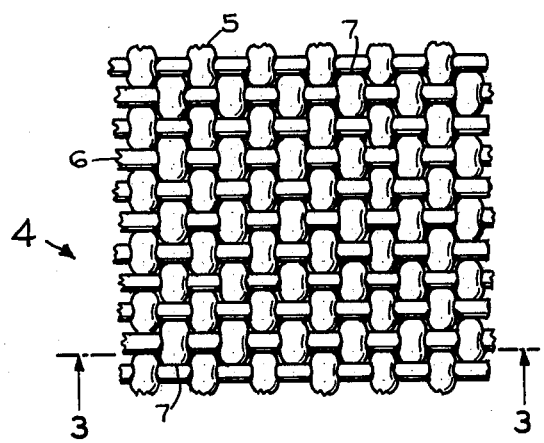
FIGURE 2 is an elevational view of the material shown in FIGURE 1 after the blowing step has occurred.

In FIGURE 2, the material of FIGURE 1 is depicted after thermal treatment and activation of the blowing agent. Warp and woof strands 5 and 6 have become a cellular material and are integrally bonded together by weldments at their junctures 7, this latter feature being more graphically set forth in FIGURE 3. The warp and woof strands have expanded substantially in cross section over the identical strands shown in FIGURE 1. Material 4 is now tightly woven and has acquired mechanical strength to a marked degree over that possessed by the same material prior to the expansion step.

As a result of this treatment, therefore, there has been produced a product having the characteristics hereinbefore described, which are enhanced over the properties of material heretofore known to the art. Furthermore, these properties, as a result of my invention, are introduced into an article after it has been formed into the shape of the desired final product, thereby permitting both greater control of size, shape and dimensional characteristics as well as imparting great physical strength, than can be obtained from processes or in articles presently known.

Figure 4:
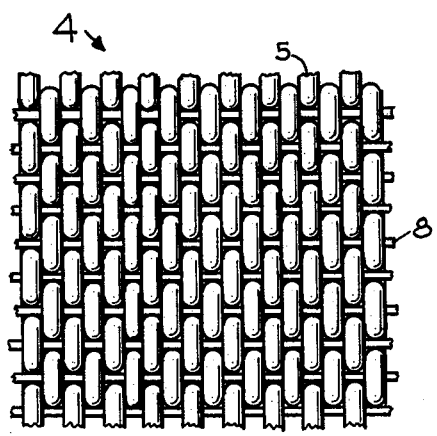
FIGURE 4 is an elevational view of an alternate form of invention.

FIGURE 4 shows an alternate form of the invention in which warp strands 5, for example, are in the expanded condition as described above. The woof strands 8 of this embodiment induce an additional feature in that they comprise either an unexpanded thread of thermoplastic resin, with or without a core, or a thread of other suitable non-expandable material such as wire, twisted paper, rayon, cotton, or other natural or synthetic fibers. In connection with this figure, it will also be understood that strands 8 can comprise an expanded material similar to the expanded material of warp strands 5, but in which the expansion has been carried out to a lesser degree. The desired amount of expansion can, of course, be controlled by controlling the amount of blowing agent in the original mix.

Figure 5:
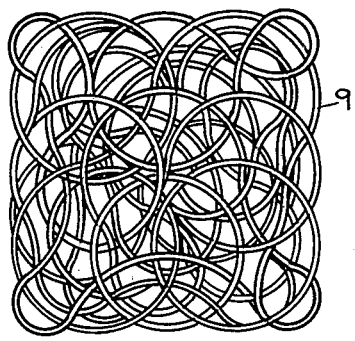
FIGURE 5 is an elevational view of still another form of the invention.

FIGURE 5 shows still another form of the invention in which strand 9 is laid down at random and criss-crossed back and forth across itself rather than being knitted or woven as shown in FIGURES 1–4 inclusive. This matted or felted material is then heat treated to decompose the blowing agent and weld the junctures of the strand together as has hereinbefore been described.

Other forms and variations of this invention will readily occur to those skilled in the art. Accordingly, it is intended that the scope of the present invention shall be limited only by the scope of the claims attached hereto.

I claim:

1. A fabric comprising crossing threads of a sponge-like gas expanded thermoplastic resin, selected from the group consisting of polyvinyl chloride, polyethylene, nylon, copolymers of vinyl chloride and vinylidene chloride in which the vinylidene chloride is present in an amount up to about 10%, and copolymers of vinyl chloride and vinyl acetate in which the vinyl acetate is present in an amount up to about 25%, said threads being integrally joined at the junctures thereof by weldments formed of said expanded resin.

2. A woven fabric comprising warp and woof threads of a sponge-like gas expanded thermoplastic resin selected from the group consisting of polyvinyl chloride, polyethylene, nylon, copolymers of vinyl chloride and vinylidene chloride in which the vinylidene chloride is present in an amount up to about 10%, and copolymers of vinyl chloride and vinyl acetate in which the vinyl acetate is present in the amount up to about 25%, adjacent portions of said woof threads being blended together at junctures thereof.

3. The woven fabric of claim 2 in which the warp and woof threads consist of a core of a heat resistant material surrounded by said gas expanded thermoplastic resin.

4. A fabric-like material comprising warp and woof threads of gas expanded polyvinyl chloride, adjacent portions of said warp and woof threads being blended together at the junctures thereof.

5. A fabric-like material comprising warp and woof threads consisting of a core of heat resistant material surrounded by gas expanded polyvinyl chloride, adjacent surfaces of said warp and woof threads being joined by weldments formed of said expanded polyvinyl chloride.

6. A fabric-like material characterized by a high degree of sponginess and resiliency and consisting of warp and woof threads having a central core covered by gas expanded polyvinyl chloride, adjacent portions of said warp and woof threads being blended together at junctures thereof.

7. A woven fabric comprising threads of a sponge-like gas expanded thermoplastic resin selected from the group consisting of polyvinyl chloride, polyethylene, nylon, copolymers of vinyl chloride and vinylidene chloride in which the vinylidene chloride is present in an amount up to about 10%, and copolymers of vinyl chloride and vinyl acetate in which the vinyl acetate is present in an amount up to about 25%, and non-thermoplastic threads interwoven therewith, said thermoplastic resin threads being expanded around said non-thermoplastic threads and integrally joined to each other and to said non-thermoplastic threads by means of a surface welding of said thermoplastic resin upon the heating of said fabric to expand said thermoplastic resin threads.

8. A fabric material comprising criss-crossed threads forming a plurality of junctures, at least a plurality of said threads comprising a gas expandable thermoplastic resin selected from the group consisting of polyvinyl chloride, polyethylene, nylon, copolymers of vinyl chloride and vinylidene chloride in which the vinylidene chloride is present in an amount up to about 10%, and copolymers of vinyl chloride and vinyl acetate in which the vinyl acetate is present in an amount up to about 25%, said fabric being characterized by the expansion thereof after said criss-crossing to produce expansion of each thread partly about the other in the regions of said junctures and throughout said threads from front to back of the fabric material and said threads, throughout their contacting areas in the regions of said junctures, being blended into one another while under the expansion forces by a surface welding of said thermoplastic resin throughout said area.

9. A woven fabric comprising warp and woof threads, each thread consisting of a core of a heat resistant textile material surrounded by a uniform coating of a gas expandable thermoplastic resin selected from the group consisting of polyvinyl chloride, copolymers of vinyl chloride and vinylidene chloride, and copolymers of vinyl chloride and vinyl acetate, said warp and woof threads being characterized by their expansion and deformation by the expansion forces one about the other and into a sponge-like character throughout their respective lengths as by activation of said gas expandable resin after the weaving of said fabric and by the further fact that said warp and woof threads are blended into one another in the areas of their deformation one about the other by means of a surface welding of the adjoining thermoplastic resin thereof throughout said areas.

10. A fabric comprising interlaced threads forming a plurality of junctures, at least a substantial portion of the threads forming the junctures comprising an expanded thermoplastic resin selected from the group consisting of polyvinyl chloride, polyethylene, nylon, copolymers of vinyl chloride and vinylidene chloride in which the vinylidene chloride is present in an amount up to 10% and copolymers of vinyl chloride and vinyl acetate in which the vinyl acetate is present in an amount up to 25%, said last-named threads of the fabric being characterized by their expansion in said interlaced relationship into partial envelopment each of the other at said junctures and surface-welded together in all regions of contact with retention throughout the welded regions of the porous character resulting from their expansion.

11. A fabric comprising interlaced thread material of expanded thermoplastic resin, adjacent portions of said material being in surface contact with one another along mutually partial-enveloping surfaces, and weldments formed of said expanded material along at least the major portions of said mutually partial-enveloping surfaces.

References Cited in the file of this patent

UNITED STATES PATENTS

| | | |
|---|---|---|
| 1,002,829 | Dunning | Sept. 12, 1911 |
| 1,585,043 | Meier | May 18, 1926 |
| 1,978,041 | Dodge | Oct. 23, 1934 |
| 2,268,160 | Miles | Dec. 30, 1941 |
| 2,399,259 | Taylor | Apr. 30, 1946 |
| 2,399,260 | Taylor | Apr. 30, 1946 |
| 2,409,660 | Briggs | Oct. 22, 1946 |
| 2,459,620 | Cleeland et al. | Jan. 18, 1949 |
| 2,476,293 | Hall et al. | July 19, 1949 |
| 2,521,055 | Foster | Sept. 5, 1950 |
| 2,769,222 | Southwell | Nov. 6, 1956 |
| 2,804,098 | Walters | Aug. 27, 1957 |
| 2,806,248 | Craig | Sept. 17, 1957 |
| 2,815,559 | Robinson | Dec. 10, 1957 |
| 2,913,769 | Kastli | Nov. 24, 1959 |

FOREIGN PATENTS

| | | |
|---|---|---|
| 542,577 | Belgium | Nov. 30, 1955 |